United States Patent
Matsuki

(10) Patent No.: US 6,954,434 B2
(45) Date of Patent: Oct. 11, 2005

(54) CDMA MOBILE COMMUNICATION SYSTEM AND TRANSMISSION POWER CONTROL METHOD THEREFOR

(75) Inventor: Toru Matsuki, Tokyo (JP)

(73) Assignee: NEC Corporation, Tokyo (JP)

( * ) Notice: Subject to any disclaimer, the term of this patent is extended or adjusted under 35 U.S.C. 154(b) by 835 days.

(21) Appl. No.: 09/840,032

(22) Filed: Apr. 24, 2001

(65) Prior Publication Data

US 2001/0033558 A1 Oct. 25, 2001

(30) Foreign Application Priority Data

Apr. 25, 2000 (JP) ..................................... 2000-124067

(51) Int. Cl.⁷ ............................................. H04B 7/216
(52) U.S. Cl. ...................... 370/252; 370/335; 455/522
(58) Field of Search ................................ 370/335, 318, 370/320, 342, 207; 455/436, 522; 375/147

(56) References Cited

U.S. PATENT DOCUMENTS

| | | | | |
|---|---|---|---|---|
| 5,873,028 A | * | 2/1999 | Nakano et al. ................ | 455/69 |
| 6,097,972 A | * | 8/2000 | Saints et al. ................. | 455/572 |
| 6,370,109 B1 | * | 4/2002 | Schwartz et al. ........... | 370/203 |
| 6,529,482 B1 | * | 3/2003 | Lundby ....................... | 370/252 |
| 2001/0019961 A1 | * | 9/2001 | Nakahara et al. ........... | 455/522 |
| 2001/0022807 A1 | * | 9/2001 | Yotsumoto .................. | 375/147 |

FOREIGN PATENT DOCUMENTS

| | | | | |
|---|---|---|---|---|
| EP | 668665 A1 | * | 8/1995 | .......... H04B/7/005 |
| EP | 1047208 A1 | * | 10/2000 | .......... H04B/7/005 |
| WO | WO00/25444 | * | 5/2000 | .......... H04B/7/005 |

* cited by examiner

Primary Examiner—Chau Nguyen
Assistant Examiner—Zewdu Habte
(74) Attorney, Agent, or Firm—Foley & Lardner LLP

(57) ABSTRACT

A CDMA mobile communication system includes a base station and a mobile station. The base station includes a monitor section, calculating section, and notification section. The monitor section monitors a forward-link transmission power value radiated to the mobile station. When the forward-link transmission power value becomes smaller than a predetermined steady output value, the calculating section calculates system parameter information of the mobile station, which corresponds to the reduced forward-link transmission power value. The notification section notifies the mobile station of the system parameter information of the mobile station. The mobile station includes a transmission power control section. When the mobile station in the standby state starts originating/terminating operation to/from the base station, the transmission power control section controls the transmission power value of the reverse-link control channel from the mobile station on the basis of a value obtained from the reception field strength value of the forward-link control channel from the base station and the system parameter information of the mobile station. A transmission power control method for the above system is also disclosed.

18 Claims, 4 Drawing Sheets

CDMA MOBILE COMMUNICATION SYSTEM AND TRANSMISSION POWER CONTROL METHOD THEREFOR

BACKGROUND OF THE INVENTION

The present invention relates to a mobile communication system using the CDMA (Code Division Multiple Access) scheme and a transmission power control method therefor and, more particularly, to a transmission power control system and method in malfunction of the transmitting unit of a base station and a decrease in transmission power.

Along with the recent progress in electronic communication technology, mobile communication systems such as automobile telephones and portable telephones are rapidly proliferating. At the same time, the mobile communication scheme is also shifting from the TDMA (Time Division Multiple Access) to the CDMA.

The cellular mobile communication system using the CDMA scheme generally has the following advantages.
1) The system has high resiliency against interference such as radio interference or disturbance.
2) The system rarely interferes with another system because the power spectrum density is low.
3) The system is excellent in security because the power spectrum density is low.
4) The system can realize satisfactory privacy protection by spreading codes.
5) Use of different spreading codes allows multiple access.
6) Overload communication is possible.

However, the system has not only the advantages but also problems. One of the problems is the interference problem. A typical interference problem is the near-far problem. The near-far problem is a phenomenon in which during communication between a base station and a desired mobile station at a remote site, another interfering mobile station near the base station gives large disturbance to the desired mobile station that is communicating. Such an interference problem is not limited to the CDMA. Even for a conventional mobile communication system, this problem is known as interchannel interference (single channel interference/neighboring channel interference). This problem is especially conspicuous in the CDMA because a number of mobile stations share a single frequency.

To solve the interference problem, a mobile communication system using the CDMA scheme has various transmission power control means for reducing the interference amount. Transmission power control includes reverse-link (up-link) transmission power control from a mobile station to a base station and forward-link (down-link) transmission power control from a base station to a mobile station.

Reverse-link transmission power control based on the TIA/EIA (Telecommunication Industry Association/ Electronic Industry Association) IS-95 standard will be described next. Reception quality measurement in reverse-link transmission power control is done by the receiving section of a base station. That is, a base station measures the reception quality of a radio signal sent from a mobile station, and if the reception quality is more than a predetermined threshold value, instructs the mobile station by a power control bit to reduce the transmission power. If the reception quality is less than the predetermined threshold value, the base station instructs the mobile station by a power control bit to increase the transmission power. This reverse-link transmission power control is called a closed-loop transmission power control scheme.

However, the conventional reverse-link transmission power control scheme has the following problems. As shown in FIG. 4, in the conventional scheme, the mobile station in the standby state has completed synchronization acquisition with the base station and is set in the idle state while performing control channel transmission/reception such as field measurement in the peripheral zone and position registration according to a change in position (step S11). The mobile station in this state has already received from the base station system parameters related to the mobile station and stored them when powered on.

System parameters related to a mobile station are a plurality of constants that define the system conditions of the mobile station in the mobile communication system, and are determined in advance in designing the entire system including the base station. The system parameters related to the mobile station are stored in the base station together with system parameters related to the base station. Every time a new mobile station is activated, the system parameters related to the mobile station are transferred from the base station to the mobile station via a control channel.

Assume that the transmitting unit (TX) of the base station malfunctions to make the forward-link transmission power of the base station lower than a predetermined steady transmission output (step S12), and then, the mobile station in the standby state starts originating or terminating operation.

For the reverse-link control channel at the mobile station that is starting originating or terminating operation, since transmission power control operation by a closed loop is not activated, transmission power control operation by the mobile station is activated. In the basic operation of transmission power control performed by the mobile station, near the mobile station (at a point where the reception field strength of the forward-link control channel at the mobile station is high), the reverse-link transmission power of the mobile station is set to be low in order to reduce the reverse-link interference amount at the base station. On the other hand, at a point far from the base station (at a point where the reception field strength of the forward-link control channel at the mobile station is low), the reverse-link transmission power of the mobile station is set to be high in order to ensure the speech communication quality.

Hence, the reverse-link control channel at the mobile station that is starting originating or terminating operation is set to transmission power whose value is the sum of a variable value inversely proportional to the reception field strength of the forward-link control channel from the base station and a fixed value based on the transmission power initial constant of the system parameters related to the mobile station (step S13). The set reverse-link transmission power is radiated to the control channel between the mobile station and the base station (step S14).

That is, the reception field strength value of the forward-link control channel decreases in linkage with the reduced transmission power of the base station, and the transmission power value of the reverse-link control channel at the mobile station increases in inverse proportion to that reception field strength. For this reason, the amount of interference to the base station and neighboring base stations increases.

If the communication shifts to the traffic channel (TCH) to perform actual speech communication, transmission power control processing by a closed loop starts, and the reverse-link transmission power is controlled to an appropriate value (steps S15 and S16).

As described above, when the transmission power of the base station abruptly decreases, the reception field strength of the forward-link control channel abruptly decreases, and consequently, the mobile station which is standing by in the service area of the mobile station erroneously recognizes that the mobile station has moved away from the base station in an instant. For this reason, the mobile station radiates transmission power more than the appropriate value in the reverse-link control channel in starting originating or terminating operation.

SUMMARY OF THE INVENTION

It is an object of the present invention to provide a CDMA mobile communication system and a transmission power control method therefor, which can reduce the interference amount on a base station or neighboring base station when the transmitting unit of the mobile station malfunctions to decreases the transmission power.

In order to achieve the above object, according to the present invention, there is provided a CDMA (Code Division Multiple Access) mobile communication system comprising a base station and a mobile station connected to the base station by radio through reverse-link and forward-link control channels, the base station comprising monitor means for monitoring a forward-link transmission power value radiated to the mobile station, calculation means for, when the forward-link transmission power value becomes smaller than a predetermined steady output value, calculating system parameter information of the mobile station, which corresponds to the reduced forward-link transmission power value, and notification means for notifying the mobile station of the system parameter information of the mobile station, which is output from the calculated means, and the mobile station comprising transmission power control means for, when the mobile station in a standby state starts originating/terminating operation to/from the base station, controlling a transmission power value of the reverse-link control channel from the mobile station on the basis of a value obtained from a reception field strength value of the forward-link control channel from the base station and the system parameter information of the mobile station, which is transmitted from the base station.

DESCRIPTION OF THE PREFERRED EMBODIMENT

The present invention will be described below in detail with reference to the accompanying drawings.

Figure 1:
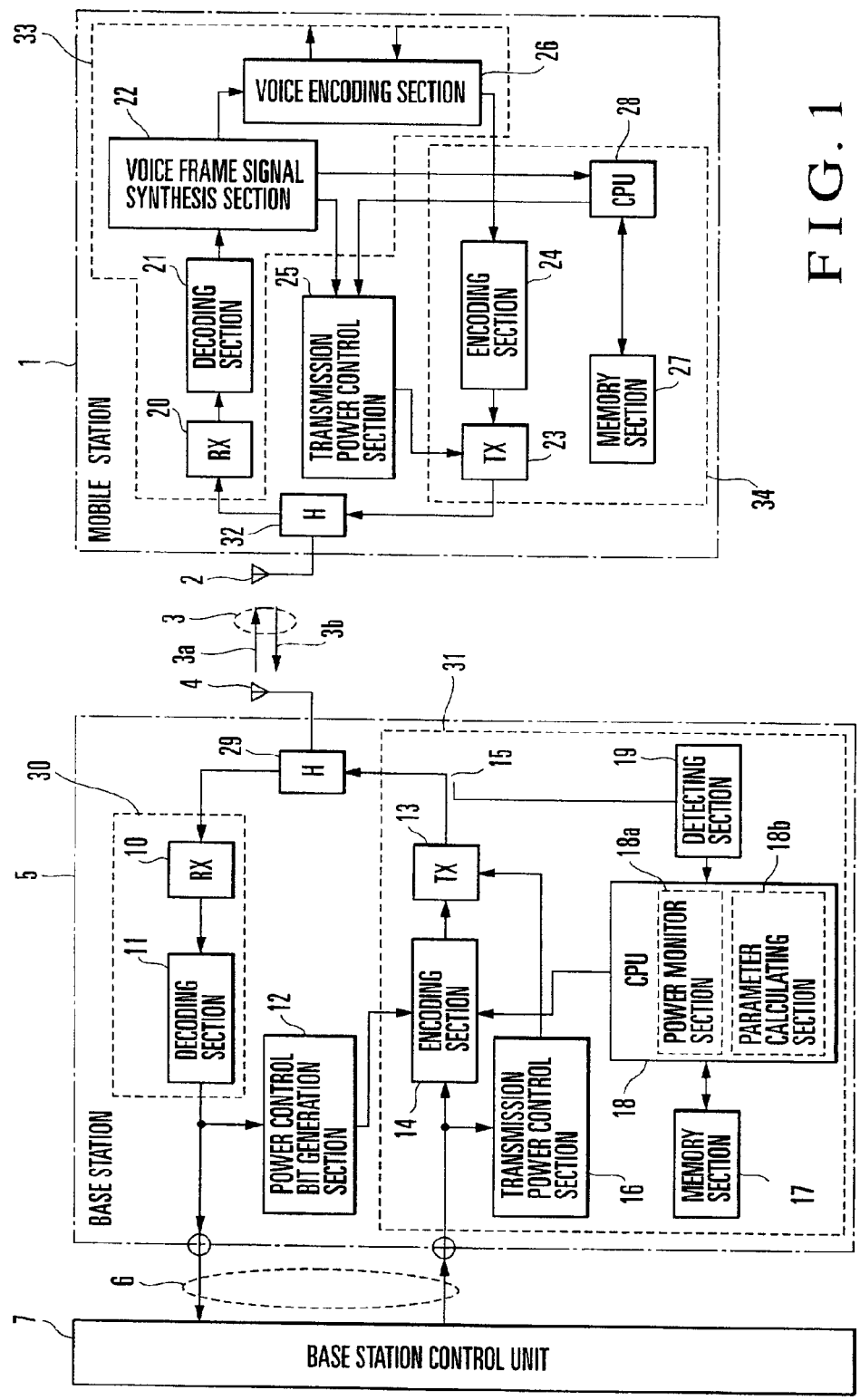
FIG. 1 is a block diagram of a CDMA mobile communication system according to an embodiment of the present invention.

FIG. 1 shows the system configuration of a CDMA mobile communication system according to an embodiment of the present invention. As shown in FIG. 1, a base station control unit 7 is connected to a base station 5 through a wired transmission approach line 6 formed from a leased line. The base station 5 is connected to a mobile station 1 via a radio channel 3. The radio channel 3 comprises a reverse-link radio channel 3b from the mobile station 1 to the base station 5 and a forward-link radio channel 3a from the base station 5 to the mobile station 1.

An up-link unit 30 of the base station 5 is constituted by a receiving section (RX) 10 for receiving a reverse-link radio signal transmitted from the mobile station 1 through an antenna 4 and hybrid circuit (H) 29 and demodulating the signal, and a decoding section 11 for decoding the signal demodulated by the receiving section 10 into a reverse-link voice frame signal. A reception value Eb/No' (=energy per bit/noise amount per Hz) as the reception quality of the signal decoded by the decoding section 11 is sent to a power control bit generation section 12. The power control bit generation section 12 compares the reception value Eb/No' with an internally generated reference value Eb/No and generates a power control bit for controlling reverse-link transmission power of the mobile station 1. The decoded reverse-link voice frame signal from the decoding section 11 is sent to the base station control unit 7.

A down-link unit 31 of the base station 5 is constituted by an encoding section 14 for encoding a forward-link voice frame signal sent from the base station control unit 7, a transmitting section (TX) 13 for modulating the signal encoded by the encoding section 14 and then transmitting the signal through the hybrid circuit 29 and antenna 4, a transmission power control section 16 for calculating and appropriately changing forward-link transmission power on the basis of field strength information and reference value Ec/Io (=signal to interference wave power ratio) sent from the base station control unit 7, a detecting section 19 for detecting a small transmission radio wave picked up by a directional coupler 15 which is provided midway along a feeder cable for connecting the antenna 4 and the output terminal of the transmitting section 13, a CPU (Central Processing Unit) 18 for monitoring the forward-link transmission power of the base station 5 and controlling the entire base station by arithmetically processing the detection output from the detecting section 19, and a memory section 17 for storing various kinds of control programs, control data, and system parameters as defined values related to the operations of the base station 5 and mobile station 1.

The CPU 18 has functional blocks: a power monitor section 18a for monitoring the value of forward-link transmission power radiated to the mobile station 1, on the basis of the output from the detecting section 19, and a parameter calculating section 18b for, when the forward-link transmission power value becomes smaller than a predetermined steady output value, calculating the transmission power initial constant (system parameter) of the mobile station 1 in correspondence with the decreased forward-link transmission power value.

A down-link unit 33 of the mobile station 1 is constituted by a receiving section (RX) 20 for receiving a forward-link radio signal transmitted from the base station 5 through an antenna 2 and hybrid circuit 32 and demodulating the signal, a decoding section 21 for decoding the signal demodulated by the receiving section 20 into a forward-link voice frame signal, a voice frame signal synthesis section 22 for performing weighting synthesis on the basis of voice data signal quality information in the forward-link voice frame signal, and a voice encoding section 26 for converting voice data in the forward-link voice frame signal into a forward-link voice signal.

An up-link unit 34 of the mobile station 1 is constituted by the voice encoding section 26 for converting a reverse-link voice signal into voice data in a reverse-link voice frame signal, an encoding section 24 for encoding the reverse-link voice frame signal, a transmitting section (TX) 23 for modulating the signal encoded by the encoding section 24 and then transmitting the signal through the hybrid circuit 32 and antenna 2, a transmission power control section 25 for controlling transmission power on the basis of information sent from the base station 5, a CPU 28 for extracting from the voice frame signal synthesis section 22 system parameters related to the mobile station 1, which are sent from the base station 5, and controlling the entire mobile station, and a memory section 27 for storing various kinds of control programs, control data, and extracted system parameters.

When the mobile station 1 is standing by, the transmission power control section 25 controls the transmission power value of the reverse-link control channel 3b from the mobile station 1 on the basis of a value obtained from the reception field strength value of the forward-link control channel 3a from the base station 5 and the system parameters of the mobile station 1, which are transmitted from the base station 5, as will be described later. When the mobile station 1 is busy upon originating or terminating operation, the transmission power control section 25 performs transmission power control by a closed loop on the basis of a power control bit sent from the base station 5.

Transmission power control operation of the system with the above configuration will be described next with reference to FIG. 2.

Figure 2:
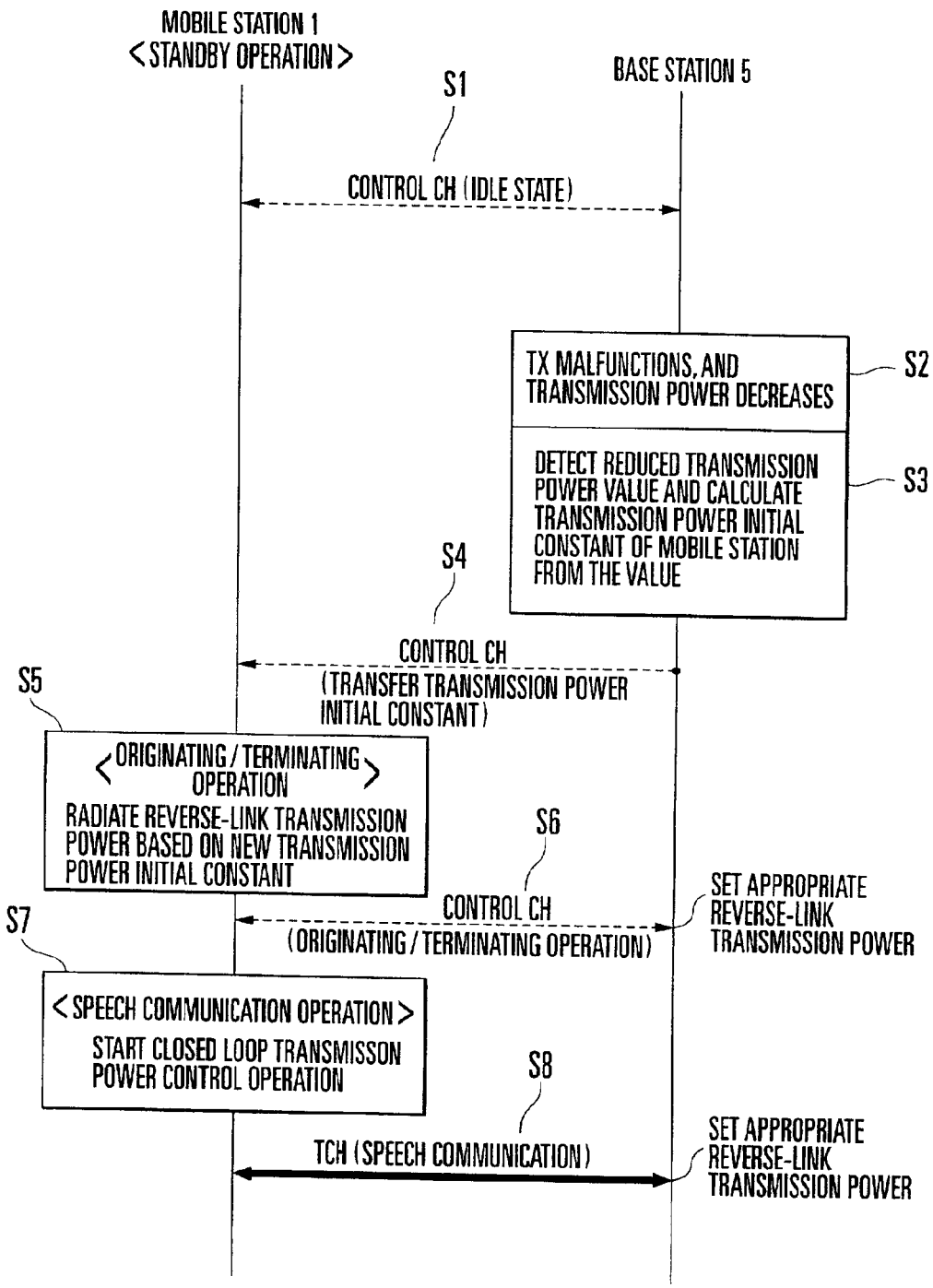
FIG. 2 is a flow chart showing transmission power control operation by the CDMA mobile communication system shown in FIG. 1.

As shown in FIG. 2, the mobile station 1 in the standby state has completed synchronization acquisition with the base station 5 and is set in the idle state while performing control channel transmission/reception such as field measurement in the peripheral zone and position registration according to a change in position (step S1). The mobile station 1 in this state has received from the base station 5 system parameters related to the mobile station and stored them in the memory section 27 when powered on.

When the transmitting unit (TX) 13 of the base station 5 malfunctions, the forward-link transmission power of the base station 5 becomes lower than a predetermined steady transmission output (step S2). The reduced transmission power value is extracted by the detecting section 19 through the directional coupler 15 and input to the CPU 18. The power monitor section 18a of the CPU 18 compares the predetermined steady transmission power value with the reduced transmission power value sent from the detecting section 19, thereby detecting the decrease in transmission power. The parameter calculating section 18b re-calculates the transmission power initial constant of the system parameters related to the mobile station 1 in correspondence with the reduced transmission power value (step S3). The re-calculated transmission power initial constant is updated and stored in the memory section 17 and simultaneously encoded by the encoding section 14 and then sent to the transmitting unit 13.

The newly calculated transmission power initial constant of the mobile station 1 becomes smaller in proportion to the reduced base station transmission power value. The transmitting unit 13 of the base station 5 transmits, to the mobile station 1 in the standby state, the reduced transmission power initial constant (system parameter information) using the forward-link control channel 3a (step S4). The new transmission power initial constant transmitted from the base station 5 is input to the CPU 28 through the down-link unit 33 and stored in the memory section 27 of the mobile station 1.

The transmission power determination algorithm of the reverse-link control channel 3b at the mobile station 1 when transmission power control operation by a closed loop is not activated (in the standby state) will be described next with reference to FIG. 3.

Figure 3:
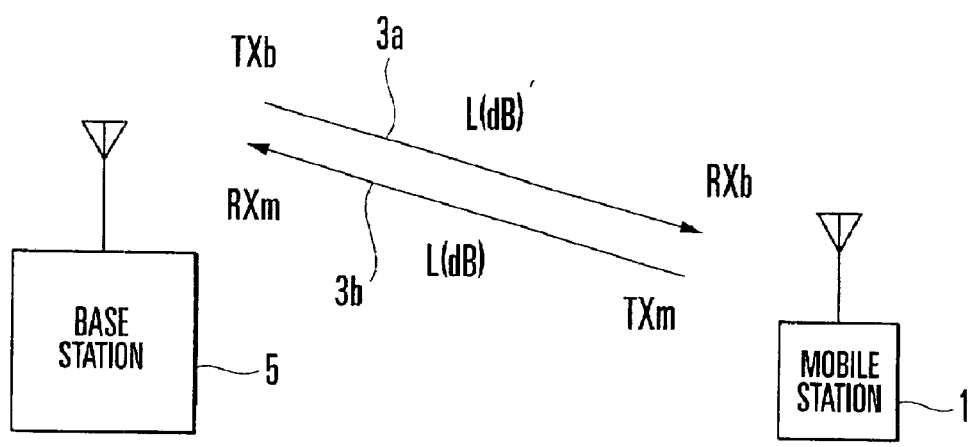
FIG. 3 is a view for explaining the transmission power determination algorithm of a reverse-link control channel at a mobile station when transmission power control operation by a closed loop is not activated.
Figure 4:
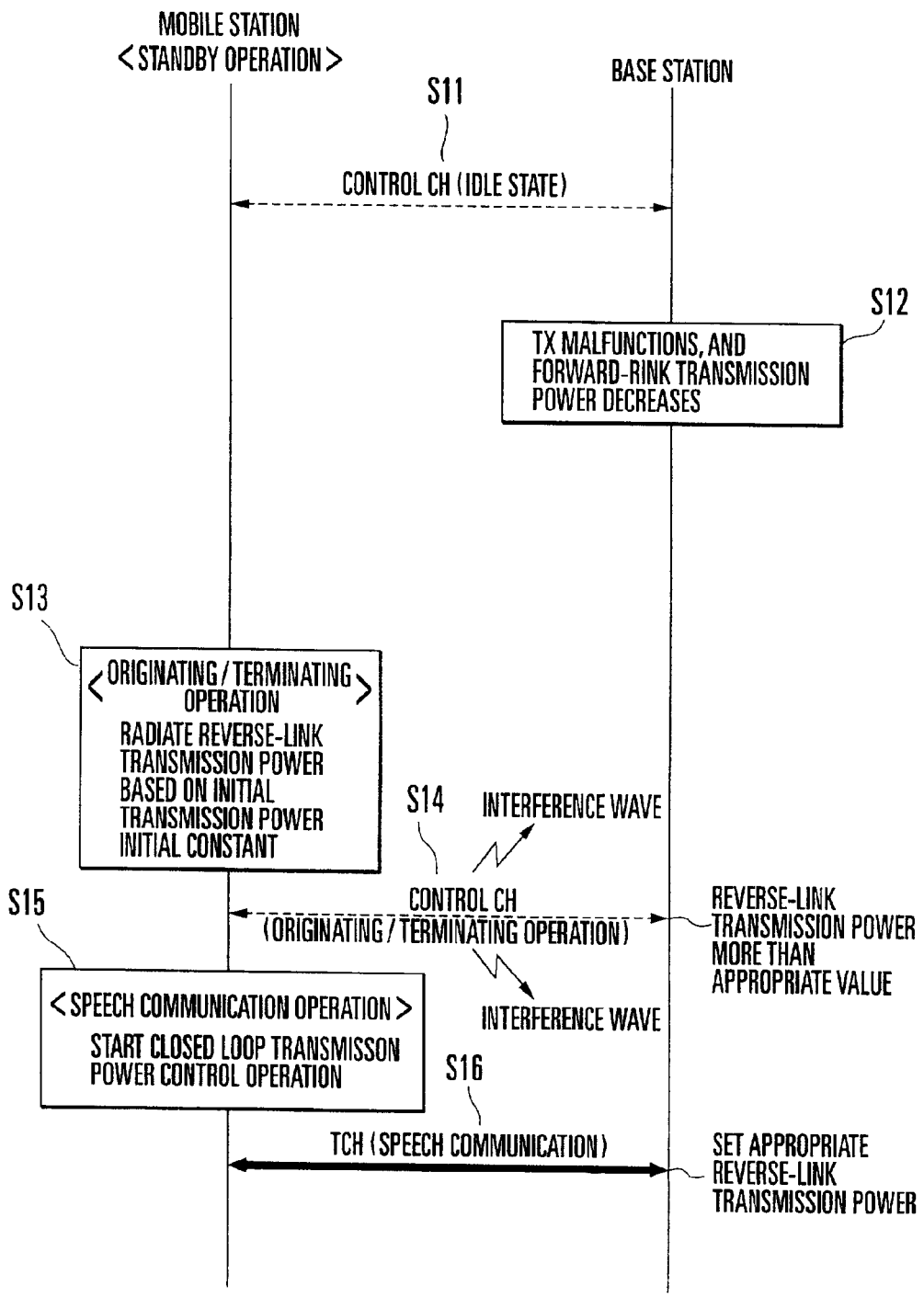
FIG. 4 is a flow chart showing conventional transmission power control operation.

As shown in FIG. 3, the base station 5 transmits the forward-link control channel 3a at transmission power TXb. In this case, the mobile station 1 receives information of the forward-link control channel 3a at a reception field strength RXb after subtraction of a propagation loss L (dB). The mobile station 1 which has received the information of the forward-link control channel 3a at the reception field strength RXb transmits the reverse-link control channel 3b to the base station 5. At this time, a transmission power TXm of the reverse-link control channel 3b is determined to the sum of a variable value −RXb in inverse proportion to the reception field strength RXb and a transmission power initial constant value (fixed value) A of the system parameters transferred to the mobile station 1 and stored in the memory section 27 in advance, i.e., the transmission power TXm is given by $$TXm = -RXb + A \tag{1}$$

The transmission power determination algorithm of the reverse-link control channel 3b at the mobile station 1 when transmission power control operation by a closed loop is not activated has been described above. This transmission power determination algorithm is executed by the transmission power control section 25 on the basis of the output from the CPU 28. The calculation of equation (1) itself may be done by the CPU 28.

Referring to FIG. 2, the mobile station 1 in the standby state starts originating or terminating operation. At this time, transmission power control operation by a closed loop has not been activated yet for the reverse-link control channel 3b at the mobile station 1. For this reason, reverse-link transmission power based on the algorithm represented by equation (1) is set (step S5), and the reverse-link control channel 3b is radiated by the newly set transmission power (step S6).

That is, the variable value in inverse proportion to the reception field strength of the forward-link control channel 3a from the base station 5 increases in linkage with the reduced transmission power from the base station 5. However, the new transmission power initial constant value transferred from the base station 5 to the mobile station 1 is set to be small in linkage with the reduced transmission power from the base station 5. For this reason, the final transmission power value of the reverse-link control channel 3b at the mobile station 1 does not increase, and the transmission power before the malfunction at the base station 5 is maintained. As a result, the interference amount on the base station 5 and neighboring base station 5 does not increase, and the transmission power of the reverse-link control channel 3b at the mobile station 1 is appropriately controlled.

If the communication shifts to the traffic channel (TCH) to perform actual speech communication, transmission power control processing by a closed loop starts, and the reverse-link transmission power is controlled to an appropriate value (steps S6 and S7).

When the malfunction of the transmitting unit (TX) 13 of the base station 5 recovers, and the forward-link transmission power of the base station 5 is restored, the transmission power initial constant (system parameter) of the mobile station 1 is restored according to the above procedure.

In the above embodiment, the base station notifies the mobile station of the reduced transmission power initial constant value (absolute value). However, a transmission power correction value may be calculated and transmitted as the difference from the initial transmission power initial constant before the transmission power of the base station decreases.

In this case, instead of determining the transmission power value of the reverse-link control channel on the basis of the value obtained from the reception field strength value of the forward-link control channel from the base station and the received transmission power initial constant value, the transmission power value of the reverse-link control channel is determined on the basis of the value obtained from the reception field strength value of the forward-link control channel from the base station and the transmission power correction value as the difference from the initial transmission power initial constant before the transmission power of the base station decreases.

As has been described above, according to the present invention, when the transmitting unit of a base station malfunctions, and the forward-link transmission power of the base station becomes smaller than a predetermined steady transmission power, a new mobile station transmission power initial constant (system parameter) or a transmission power correction value, which is calculated on the basis of the reduced base station transmission power value, is transferred from the base station to a mobile station which is standing by in the service area of the base station whereby the transmission power of the reverse-link control channel at the mobile station in originating or terminating operation can be decreased to an appropriate value, and the interference amount on the base station or neighboring base station can be reduced.

What is claimed is:

1. A CDMA (Code Division Multiple Access) mobile communication system comprising a base station and a mobile station connected to said base station by radio through reverse-link and forward-link control channels,
    said base station comprising:
    monitor means for monitoring a forward-link transmission power value radiated to said mobile station;
    calculation means for, when the forward-link transmission power value becomes smaller than a predetermined steady output value, calculating system parameter information of said mobile station, which corresponds to a reduced forward-link transmission power value; and
    notification means for notifying said mobile station of the system parameter information of said mobile station, which is output from said calculated means, and
    said mobile station comprising:
    transmission power control means for, when said mobile station in a standby state starts originating/terminating operation to/from said base station, controlling a transmission power value of the reverse-link control channel from said mobile station on the basis of a value obtained from a reception field strength value of the forward-link control channel from said base station and the system parameter information of said mobile station, which is transmitted from said base station.

2. A system according to claim 1, wherein the system parameter information of said mobile station is a transmission power initial constant value representing an absolute value of transmission power.

3. A system according to claim 1, wherein the system parameter information of said mobile station is a transmission power correction value representing a difference from a transmission power initial constant set in said base station.

4. A system according to claim 1, wherein
    said base station comprises first storage means for storing the system parameter information related to said base station and mobile station in advance, and
    when said mobile station is in the standby state, said notification means notifies said mobile station of the system parameter information related to said mobile station, which is stored in said first storage means.

5. A system according to claim 4, wherein said first storage means updates and stores the system parameter information related to said mobile station, which is calculated by said calculation means.

6. A system according to claim 4, wherein said mobile station comprises second storage means for storing the system parameter information related to said mobile station, which is transmitted from said base station.

7. A system according to claim 1, wherein said transmission power control means determines transmission power TXm of the reverse-link control channel in accordance with $$TXm = -RXb + A$$

where $-RXa$ is a variable value in inverse proportion to the reception field strength and A is a transmission power initial constant value as the system parameter information of said mobile station, which is transmitted from said base station.

8. A transmission power control method for a mobile communication system for executing radio communication between a mobile station and a base station using a CDMA (Code Division Multiple Access) scheme, comprising the steps of:
    monitoring a forward-link transmission power value radiated to the mobile station;
    when the forward-link transmission power value becomes smaller than a predetermined steady output value, calculating system parameter information of the mobile station, which corresponds to the reduced forward-link transmission power value; and
    when the mobile station in a standby state starts originating/terminating operation to/from the base station, determining a transmission power value of the reverse-link control channel from the mobile station on the basis of a value obtained from a reception field strength value of a forward-link control channel from the base station and the calculated system parameter information of the mobile station.

9. A method according to claim 8, wherein the system parameter information of the mobile station is a transmission power initial constant value representing an absolute value of transmission power.

10. A method according to claim 8, wherein the system parameter information of the mobile station is a transmission power correction value representing a difference from a transmission power initial constant set in the base station.

11. A method according to claim 8, wherein the determining step comprises the step of determining transmission power TXm of the reverse-link control channel in accordance with $$TXm = -RXb + A$$

where $-RXa$ is a variable value in inverse proportion to the reception field strength and A is a transmission power initial constant value as the system parameter information of the mobile station, which is transmitted from the base station.

12. A CDMA (Code Division Multiple Access) mobile communication system comprising a base station and a mobile station connected to said base station by radio through reverse-link and forward-link control channels, said base station comprising:
  a monitor for monitoring a forward-link transmission power value radiated to said mobile station;
  a calculation device for, when the forward-link transmission power value becomes smaller than a predetermined steady output value, calculating system parameter information of said mobile station, which corresponds to a reduced forward-link transmission power value; and
  a notification device for notifying said mobile station of the system parameter information of said mobile station, which is output from said calculation device, and said mobile station comprising:
  transmission power control device for, when said mobile station in a standby state starts originating/terminating operation to/from said base station, controlling a transmission power value of the reverse-link control channel from said mobile station on the basis of a value obtained from a reception field strength value of the forward-link control channel from said base station and the system parameter information of said mobile station, which is transmitted from said base station.

13. A system according to claim 12, wherein the system parameter information of said mobile station comprises a transmission power initial constant value representing an absolute value of transmission power.

14. A system according to claim 12, wherein the system parameter information of said mobile station comprises a transmission power correction value representing a difference from a transmission power initial constant set in said base station.

15. A system according to claim 12, wherein
said base station comprises first storage device for storing the system parameter information related to said base station and mobile station in advance, and
when said mobile station is in the standby state, said notification device notifies said mobile station of the system parameter information related to said mobile station, which is stored in said first storage device.

16. A system according to claim 15, wherein said first storage device updates and stores the system parameter information related to said mobile station, which is calculated by said calculation device.

17. A system according to claim 15, wherein said mobile station comprises second storage device for storing the system parameter information related to said mobile station, which is transmitted from said base station.

18. A system according to claim 12, wherein said transmission power control device determines transmission power TXm of the reverse-link control channel in accordance with $$TXm = -RXb + A$$

where RXa is a variable value proportional to the reception field strength and A is a transmission power initial constant value as the system parameter information of said mobile station, which is transmitted from said base station. from the base station.

* * * * *